United States Patent [19]

Cousins et al.

[11] Patent Number: 5,588,220
[45] Date of Patent: Dec. 31, 1996

[54] MEASURING TAPE DEVICE INCLUDING EXTERNAL CLEANING MEMBER

[75] Inventors: Michael Cousins, New York, N.Y.; Douglas Patrick, Lexington, Ky.; Carol T. Bassett, Patchogue, N.Y.

[73] Assignee: U.S. Tape Company, Inc., Patchogue, N.Y.

[21] Appl. No.: 202,836

[22] Filed: Feb. 28, 1994

(Under 37 CFR 1.47)

[51] Int. Cl.$^6$ .................................................... G01B 3/10
[52] U.S. Cl. ........................................... 33/768; 33/761
[58] Field of Search ........................... 33/413, 414, 755, 33/759, 760, 761, 767, 768, 769, 770; 242/396.5

[56] References Cited

U.S. PATENT DOCUMENTS

| | | | |
|---|---|---|---|
| 1,679,178 | 7/1928 | Shillman | 33/761 |
| 3,255,531 | 6/1966 | Anderson | 33/769 |
| 4,527,334 | 7/1985 | Jones et al. | 33/761 |
| 4,583,294 | 4/1986 | Hutchins et al. | 33/769 |
| 4,603,481 | 5/1986 | Cohen et al. | 33/768 |
| 4,976,048 | 12/1990 | Blackman | 33/767 |
| 4,998,356 | 3/1991 | Chapin | 33/767 |
| 5,007,178 | 4/1991 | Dewire et al. | 33/767 |

FOREIGN PATENT DOCUMENTS

| | | | |
|---|---|---|---|
| 989887 | 4/1965 | United Kingdom | 33/769 |
| 1356300 | 6/1974 | United Kingdom | 33/767 |

*Primary Examiner*—William A. Cuchlinski, Jr.
*Assistant Examiner*—G. Bradley Bennett
*Attorney, Agent, or Firm*—Alfred M. Walker

[57] ABSTRACT

A container is provided for retractable measuring tape rulers, wherein the tape is wound around an internal spring and the tape is pulled from the container for the desired length of the measurement. A novel flexible wiper flap is provided at the opening of the container, to prevent dust and contaminants from entering the interior of the measuring tape container and causing damage to the tape itself. The wiper flap is insertable within a grooved recess within the container, and the wiper flap extends down and is flexibly urged against the surface of the tape. The measuring tape is urged into a bowed configuration, so that when extended the measuring tape extends in a semi-rigid fashion during measuring. The wiper flap is also bow shaped at the bottom, and the wiper flap extends down from a tongue coupling portion insertable within corresponding longitudinally extending receptacle portions of the container. The bowed portion of the wiper flap is flexibly urged against the tape, and is responsive to moving from its vertical orientation upon the measuring tape in a slidable manner when the tape is being pulled from the container. The container also includes finger locks at the corners of the container. The internal spring is reduced in size to minimize space within the container. Moreover, a rounded lock portion is provided to ease manual locking of the tape in place at the desired extended length, wherein the rounded lock portion has a rippled elastomeric surface to facilitate gripping during use.

4 Claims, 7 Drawing Sheets

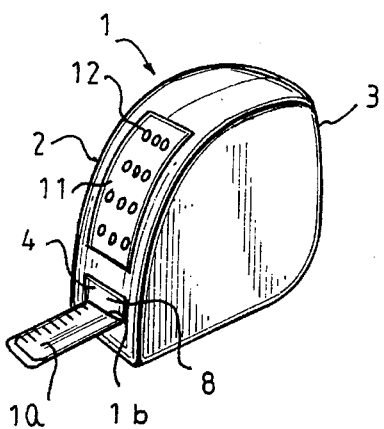
Fig.1
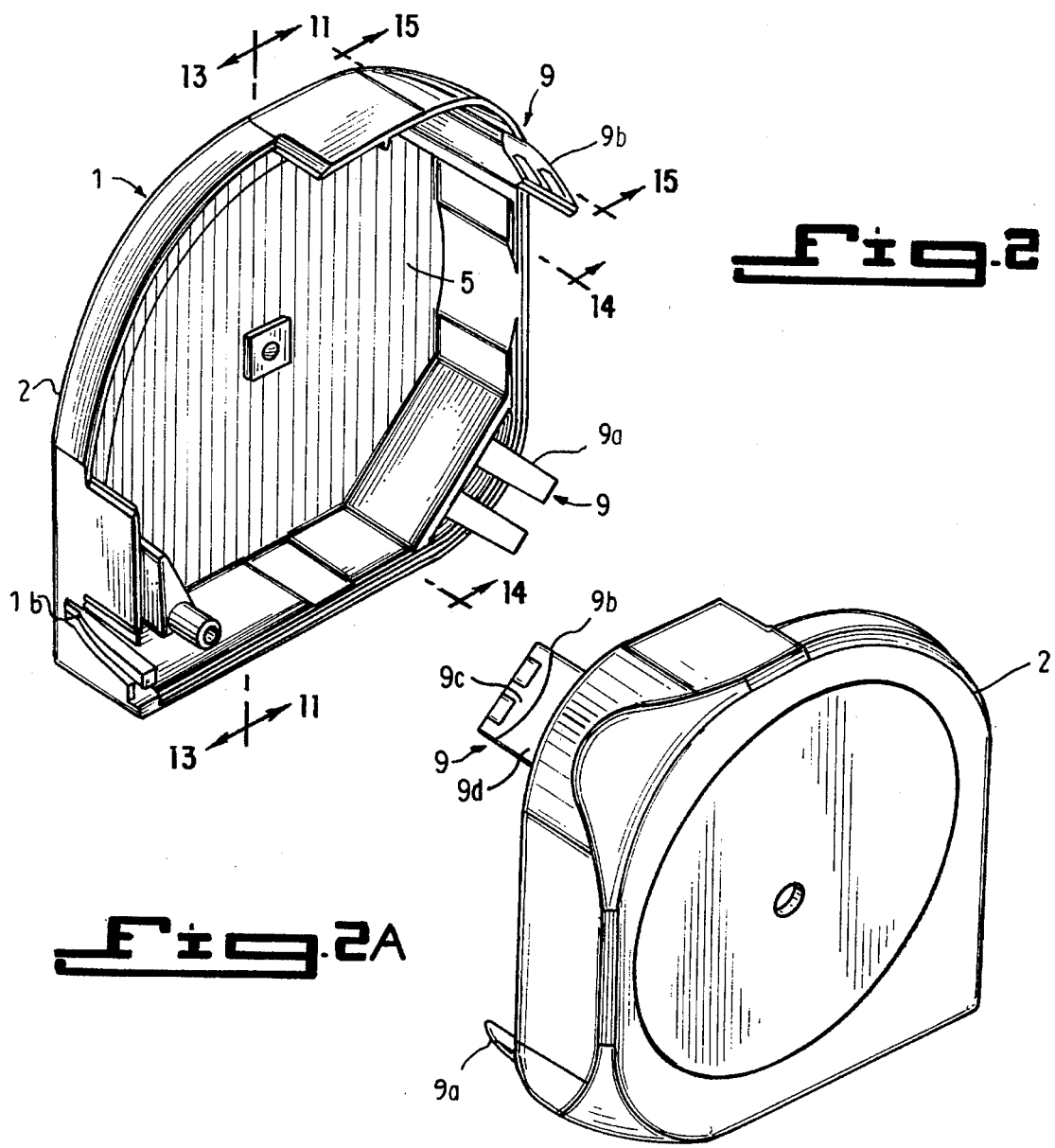
Fig.2
Fig.2A

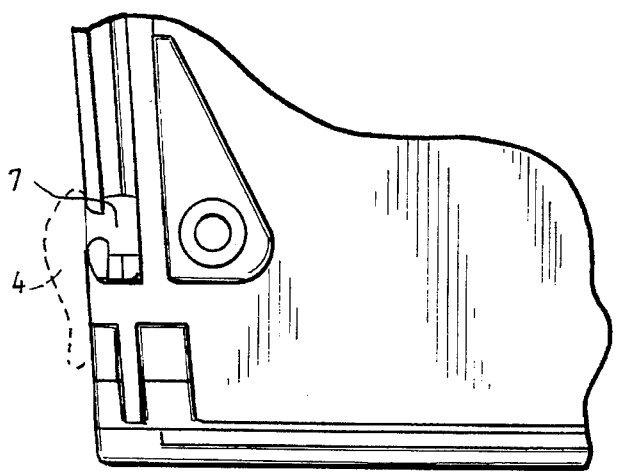
Fig.3
Fig.4
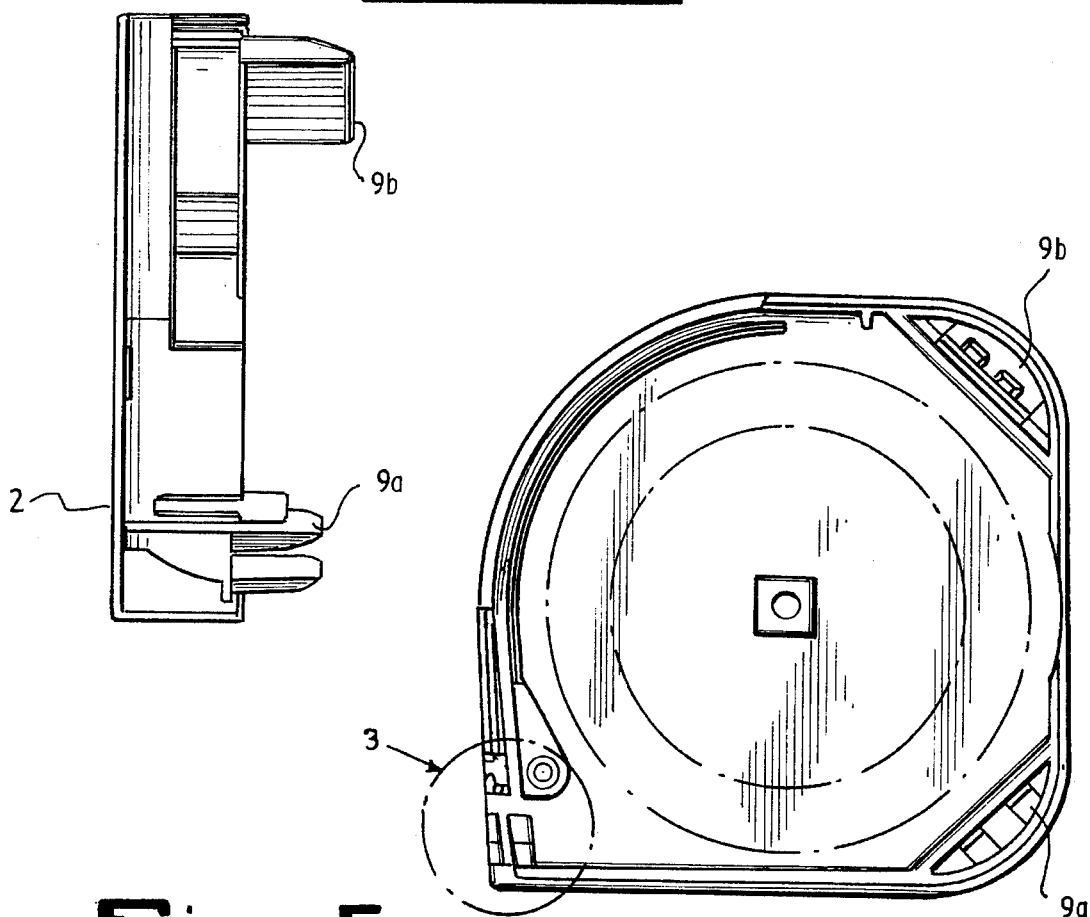
Fig.5

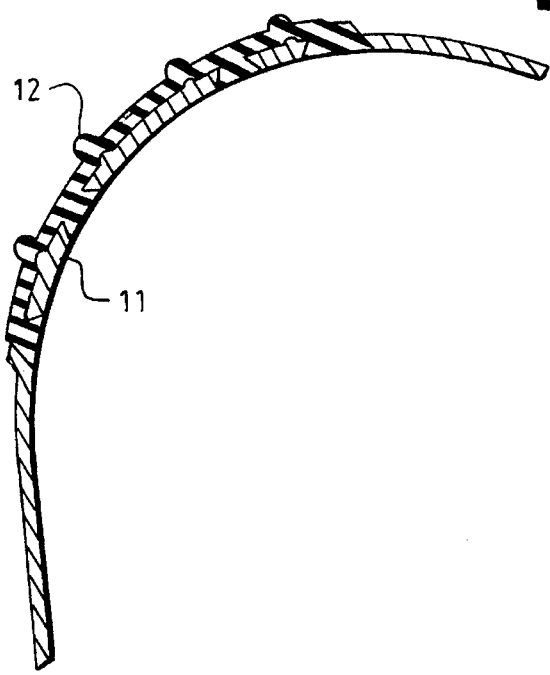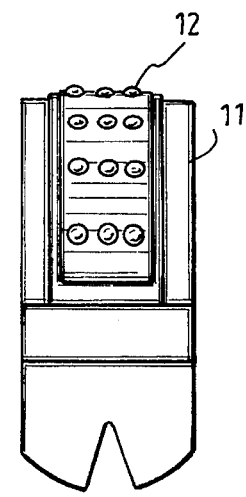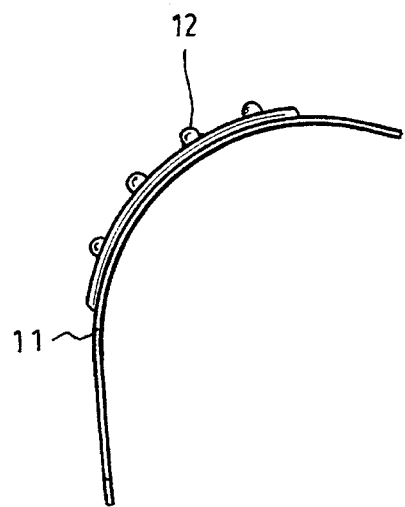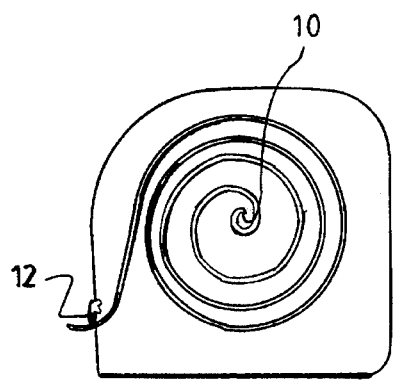

MEASURING TAPE DEVICE INCLUDING EXTERNAL CLEANING MEMBER

BACKGROUND OF THE INVENTION

The present invention relates to a container for retractable measuring tape rulers, wherein the tape is wound around an internal spring and is pulled from the container for the desired length of the measurement.

The prior art measuring tape containers includes openings from the container, which permit dust and contaminants to enter the interior of the measuring tape container, thus causing rust and other damage to the tape itself. In use, the conventional measuring tapes are urged into a bowed configuration, so that when extended the tape can extend in a semi-rigid fashion during measuring. However, the openings, which are bow shaped, also allow the dust and contaminants to enter the interior of the measuring tape container.

Conventional measuring tape containers are generally made of two interfitting parts. To facilitate opening and closing of the two part container, existing measuring tape containers include screws at the corners of the container, which are engaged by an extra tightening action, or by snaps with a snapping action. Conventional tape containers also contain a spring within the interior space within the container, to urge the wound up measuring tape when the tape is pulled out.

In addition, conventional containers have slide locks to facilitate manual locking of the tape in place at the desired extended length.

SUMMARY OF THE INVENTION

The present invention relates to a container for retractable measuring tape rulers, wherein the tape is wound around an internal spring and is pulled from the container for the desired length of the measurement.

The container includes a novel flexible wiper flap at the opening of the container, to prevent dust and contaminants from entering the interior of the measuring tape container and causing rust and other damage to the tape itself. The wiper attaches to grooves within the body of the container, and extends down and is flexibly urged against the surface of the tape to prevent the entrance of contaminants into the interior of the container. In use, the measuring tape is urged into a bowed configuration, so that when extended it can conventionally extend in a semi-rigid fashion during measuring. In order to prevent contaminants from entering, the wiper is also bow shaped at the bottom, and extends down from a coupling portion having longitudinally extending extension tabs, which reciprocally are fitted within corresponding longitudinally extending tab receptacles portions of the container. The bowed portion of the wiper flap is flexibly urged against the tape, but is responsive to moving from its vertical orientation upon the measuring tape in a slidable manner when the tape is being pulled from the container.

To facilitate opening and closing of the two part container, the present invention also includes novel finger locks at the corners of the container, which are engaged by a wedging action, not by a snapping action.

Furthermore, the internal spring is reduced in size to minimize interior space within the container.

Moreover, the container has a rounded lock portion to ease manual locking of the tape in place at the desired extended length.

A rippled elastomeric surface is applied to the lock to facilitate comfortable gripping during use.

OBJECT OF THE INVENTION

It is an object of the present invention to provide an improved container for retractable measuring tape rulers, wherein the tape is wound around an internal spring and is pulled from the container for the desired length of the measurement.

It is a further object to provide a novel flexible wiper flap at the opening of the container, to prevent dust and contaminants from entering the interior of the measuring tape container and causing rust and other damage to the tape itself.

It is yet another object to provide a wiper flap which attaches to grooves within the body of the container.

It is a further object to provide a wiper flap which is flexibly urged against the surface of the tape to prevent the entrance of contaminants into the interior of the container.

It is yet another object to provide a wiper flap which is also bow shaped at the bottom.

It is a further object to provide a coupling portion, which is reciprocally fitted within corresponding portions of the container.

It is yet another object to provide a wiper flap which is flexibly urged against the measuring tape, but which is responsive to moving from its vertical orientation upon the measuring tape in a slidable manner when the tape is being pulled from the container.

It is yet another object of the present invention to provide a means to facilitate opening and closing of a two part container, which includes novel finger locks at the corners of the container.

It is a further object to provide locks which are engaged by a wedging action, not by a snapping action.

It is yet another object to provide an internal spring which is reduced in size to minimize interior space within the container.

It is yet a further object to provide a measuring tape container which has a rounded lock portion to ease manual locking of the tape in place at a desired extended length.

It is yet another object to provide a rippled elastomeric surface upon the lock to facilitate comfortable gripping during use.

It is yet a further object to provide a measuring tape container which improves over the prior art.

DESCRIPTION OF THE DRAWINGS

In keeping with these objects and other which may become apparent, a measuring tape container is described in the drawings in which:

FIG. 1 is a perspective view of the measuring tape container of the present invention.

FIG. 2 is a perspective view of a first half portion of the measuring tape container of the present invention, as in FIG. 1.

FIG. 2A is another perspective view of the first half portion of the measuring tape container of the present invention, as in FIG. 2.

FIG. 3 is a close up sectional view of the wiper flap holding portion of the measuring tape container portions as shown in FIG. 1.

FIG. 4 is a sectional elevational view of a portion of the measuring tape container.

FIG. 5 is a side elevational view of the measuring tape first half portion as in FIG. 2.

FIG. 17 is a side elevational close up view of the finger lock portion of the present invention.

FIG. 18 is a front elevational view of the finger lock portion as in FIG. 17.

FIG. 19 is a side elevational view of the finger lock portion as in FIG. 17.

FIG. 20 is a side elevational view showing the tape and internal spring.

DETAILED DESCRIPTION OF THE DRAWINGS

As shown in FIGS. 1–20, there is provided a container 1 for retractable measuring tape rulers, wherein tape 1a is wound around an internal spring 10 and is pulled from container 1 for the desired length of the measurement.

Figure 2B:
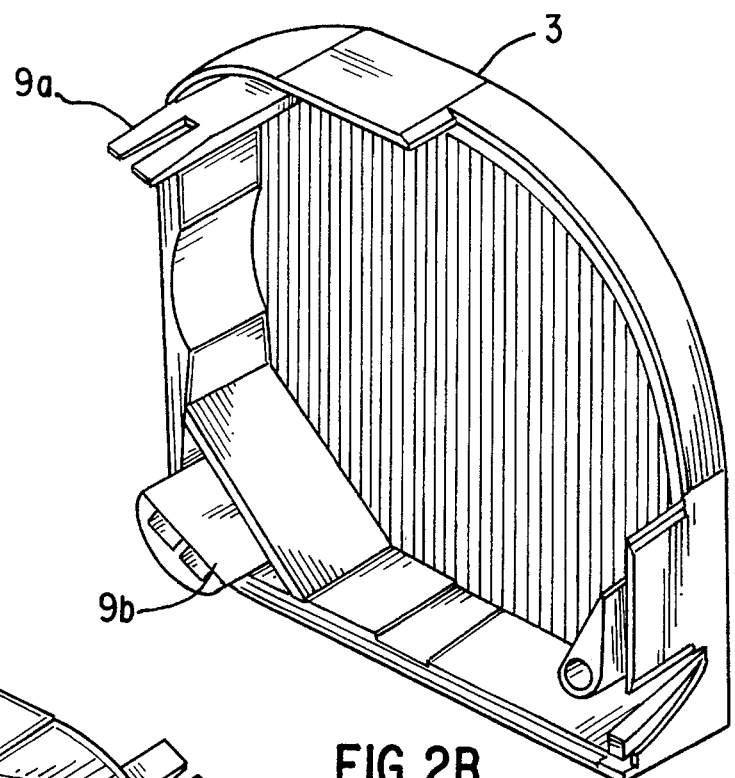
FIG. 2B is another perspective view of the second half of the measuring tape container of the present invention, as in FIG. 1.
Figure 2C:
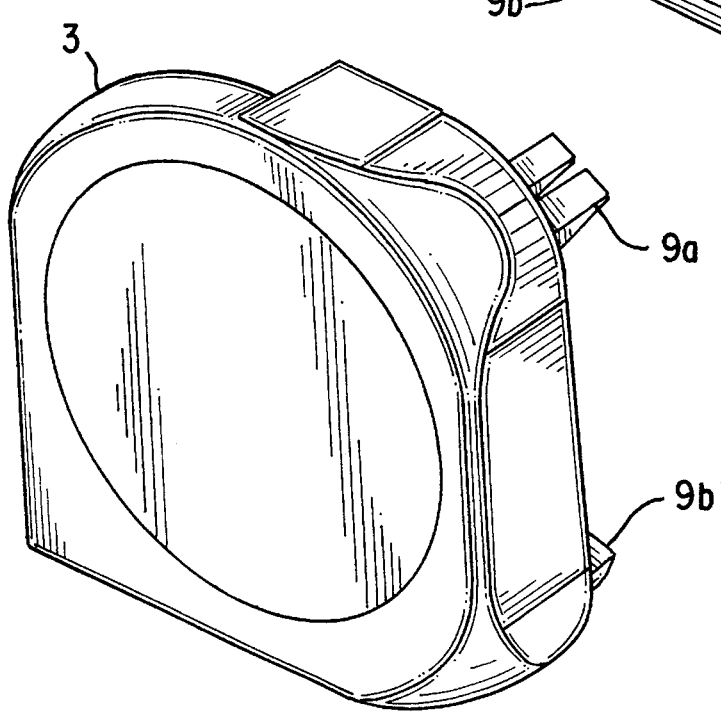
FIG. 2C is another perspective view of the second half of the measuring tape container of the present invention, as in FIG. 2B.
Figure 6:
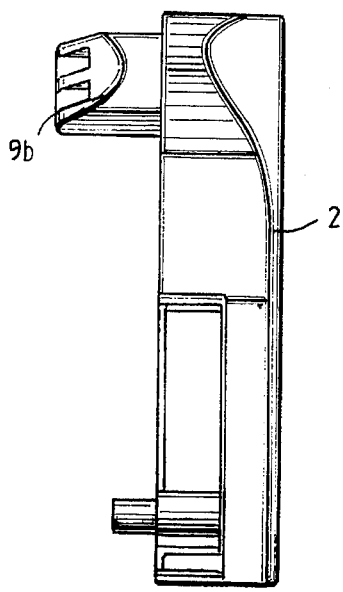
FIG. 6 is a top plan view of the measuring tape first half portion as in FIG. 2.
Figure 7:
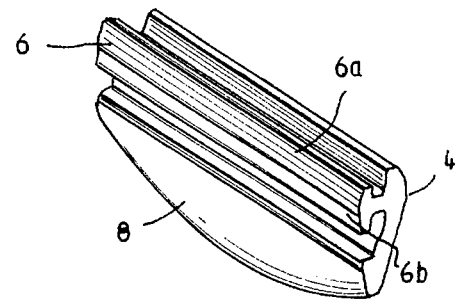
FIG. 7 is a perspective view of the wiper flap portion of the present invention.
Figure 8:
FIG. 8 is a top plan view of the wiper flap portion as in FIG. 7.
Figure 10:
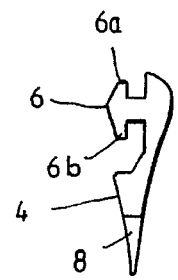
FIG. 10 is a side elevational view of the wiper flap portion as in FIG. 7.
Figure 9:
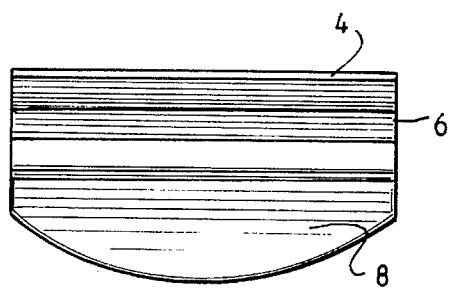
FIG. 9 is a front elevational view of the wiper flap portion as in FIG. 7.
Figure 11:
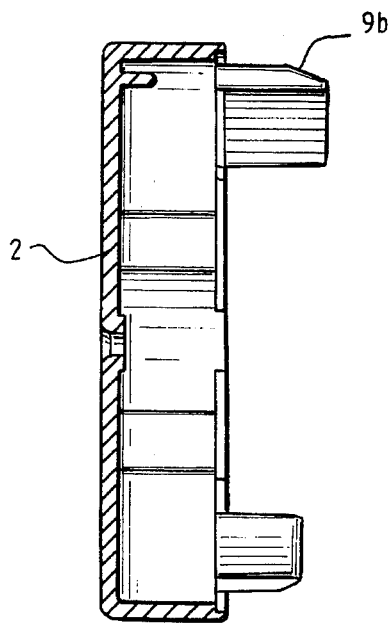
FIG. 11 is a cross sectional view of the first half of the measuring tape container, taken along lines 11—11 as in FIG. 2.
Figure 13:
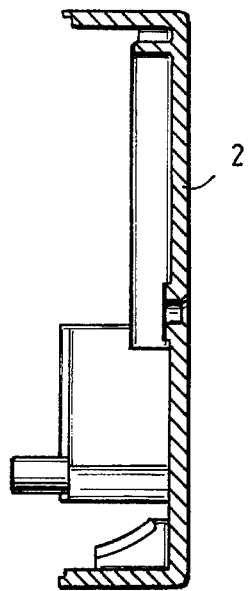
FIG. 13 is a cross sectional view of the first half of the measuring tape container, taken along lines 13—13 as in FIG. 2.
Figure 12:
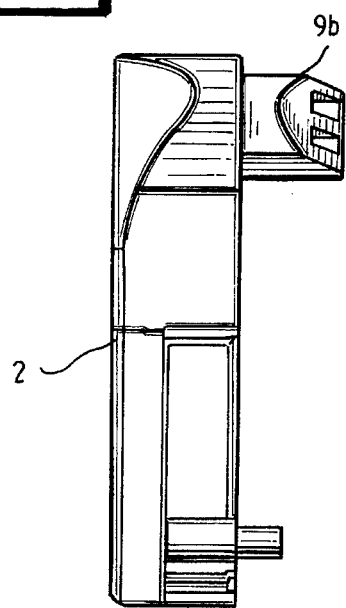
FIG. 12 is a top plan view of the first half of the measuring tape container as in FIG. 2.
Figure 14:
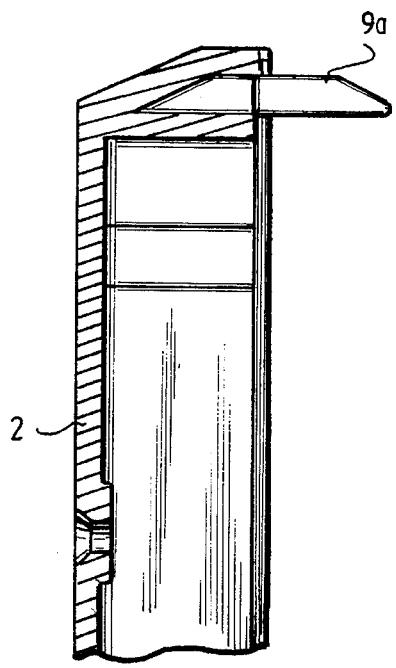
FIG. 14 is a close-up cross sectional view of the first half of the measuring tape container, taken along lines 14—14 of FIG. 2.
Figure 15:
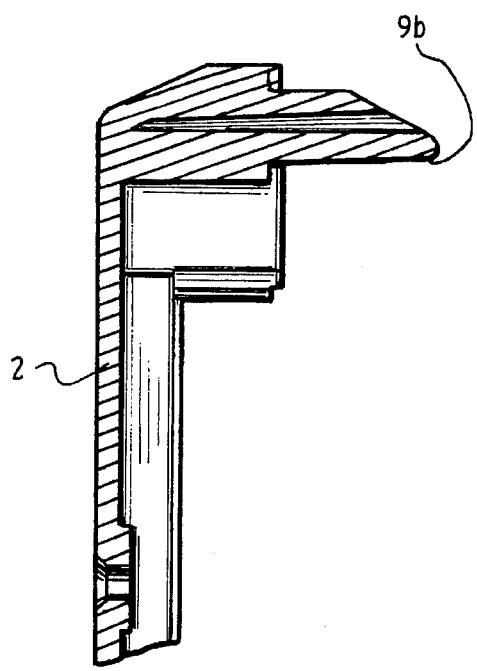
FIG. 15 is a close-up cross sectional view taken along lines 15—15 of FIG. 2.
Figure 16:
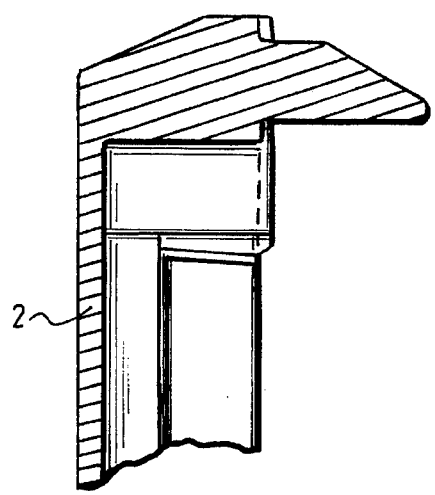
FIG. 16 is a close-up view of a portion of the first half of the tape container as in FIG. 2.

As shown in FIGS. 1, 2, 2A, 2b and 2C, container 1 includes two reciprocal interlocking portions 2 and 3 which hold a novel flexible wiper flap 4 at opening 1b of container 1, to prevent dust and contaminants from entering the interior 5 of measuring tape container 1 and causing rust and other damage to the tape 1a itself. FIGS. 2 and 2A depict first half portion 2 and FIGS. 2B and 2C depict second half portion 3.

Wiper flap 4 has a tongue portion 6 which has extending wings 6a, 6b which attach to T-shaped recess groove 7 within the body of container 1, and which flap 4 extends down and is flexibly urged against the surface of tape 1a to prevent the entrance of contaminants into the interior 5 of container 1.

In use, the measuring tape 1a is urged into a bowed configuration, so that when extended tape 1a can conventionally extend in a semi-rigid fashion during measuring. In order to prevent contaminants from entering container 1, wiper flap 4 is also bow shaped at the bottom, and wiper flap 4 extends down from a coupling tongue portion 6, which tongue portion 6 includes longitudinally extending extension wings 6a, 6b, which wings 6a, 6b reciprocally are fitted within corresponding longitudinally extending recess 7 of container 1.

Bowed portion 8 of wiper flap 4 is flexibly urged against tape 1a, but wiper flap 4 is responsive to moving from its vertical orientation upon the measuring tape 1a in a slidable manner, when tape 1a is being pulled through opening 1b from container 1.

To facilitate opening and closing of the two halves 2 and 3 of container 1, the container 1 also includes novel locks having male portions 9a and female portions 9b at the corners of the container 1, which portions 9a are engaged by a wedging action into female portions 9b, not by a snapping action.

Male portions 9a include protrusions which interfit within the cavities formed between curved outer portions 9c and brace 9d of female portions 9b.

Internal spring 10 is reduced in size to minimize interior space within container 1.

Moreover, container 1 has a rounded finger-activated tape lock portion 11 to ease manual locking of tape 1a in place at the desired extended length.

A rippled elastomeric surface with rounded projections 12 is applied to the finger-activated tape lock 11 to facilitate comfortable gripping during use.

In use, tape 1a is withdrawn from container 1 while moving slidably against flexible wiper flap 4 at the opening 1b of the container, to prevent contaminants from entering the interior 5 of measuring tape container 1. Wiper flap 4 extends down and is flexibly urged against the surface of tape 1a, which is urged into a bowed configuration, so that when extended, tape 1a can conventionally extend in a semi-rigid fashion during measuring.

Because wiper flap 4 has bow shaped bottom 8, the bowed bottom portion 8 of wiper flap 4 is flexibly urged against tape 1a, and is responsive to moving from its vertical orientation upon measuring tape 1a in a slidable manner when tape 1a is being pulled from container 1.

It is noted that other modifications may be made to the measuring tape container without deviating from the spirit and scope of the present invention, as noted in the appended claims.

I claim:

1. A container for a measuring tape, wherein the tape is wound around an internal spring and is arranged to be pulled from the container for a desired length of measurement, said container comprising:

a housing within which said tape is wound, said housing having an opening formed therein for allowing said tape to be pulled from the housing;

a flexible wiper flap located on an exterior surface of said housing so as to be located outside of said housing, said flexible wiper flap being urged against a surface of said measuring tape and said flexible wiper flap having a width and a length such that said flexible wiper flap and said measuring tape cover said opening to prevent dust and contaminants from entering the interior of the measuring tape container.

2. The container as in claim 1, wherein said housing includes a pair of interlocking portions, said container further comprising a plurality of locks located at a plurality of corners of said container for connecting said pair of interlocking portions, each of said locks including corresponding male and female portions engageable with each other by a wedging action.

3. The container as in claim 1 further comprising a rounded finger-activated tape lock member being movable along the exterior surface of said container, said container having a rippled elastomeric surface to facilitate gripping during use.

4. A container for a retractable measuring tape, wherein the tape is wound around an internal spring and is pulled from the container for the desired length of the measurement, the measuring tape being urged to have a bowed, arcuate shape, the container comprising:

a housing within which the tape is wound, said housing having an opening formed therein for allowing said tape to be pulled from the housing;

a flexible wiper flap located at an opening of said container and being disposed in contact with a surface of said measuring tape to prevent dust and contaminants from entering the interior of the measuring tape container;

said wiper flap having a tongue coupling portion attachable within a recess of said container;

said wiper flap including a measuring tape cleaning portion located at a bottom of said wiper flap, said measuring tape cleaning portion having a bowed, arcuate shape that substantially matches said bowed, arcuate shape of said measuring tape;

said bowed, arcuate cleaning portion of said wiper flap being flexibly urged against the tape such that when the measuring tape is being pulled from said opening within said housing or said tape is being retracted back into said housing via a force applied by said internal spring, said wiper flap slides along the surface of said tape and does not prevent said tape from moving.

* * * * *